United States Patent
Bohan et al.

(10) Patent No.: US 7,683,918 B2
(45) Date of Patent: Mar. 23, 2010

(54) USER INTERFACE AND METHOD THEREFOR

(75) Inventors: Michael Bohan, Fox Lake, IL (US); David B. Cranfill, Antioch, IL (US); Xiaohua Ning, Wilmette, IL (US); Chad A. Phipps, Grayslake, IL (US); Susan L. Tuttle, Grayslake, IL (US)

(73) Assignee: Motorola, Inc., Schaumburg, IL (US)

( * ) Notice: Subject to any disclaimer, the term of this patent is extended or adjusted under 35 U.S.C. 154(b) by 602 days.

(21) Appl. No.: 11/378,175

(22) Filed: Mar. 17, 2006

(65) Prior Publication Data

US 2007/0220442 A1    Sep. 20, 2007

(51) Int. Cl.
 *G09G 5/00* (2006.01)

(52) U.S. Cl. .......... 345/684; 345/156; 715/854

(58) Field of Classification Search ........ 345/156, 345/204, 684; 715/784–787, 854
See application file for complete search history.

(56) References Cited

U.S. PATENT DOCUMENTS

| | | | |
|---|---|---|---|
| 6,707,449 B2 * | 3/2004 | Hinckley et al. ........ 345/173 |
| 7,046,230 B2 | 5/2006 | Zadesky et al. | |
| 7,084,856 B2 | 8/2006 | Huppi | |
| 7,312,785 B2 | 12/2007 | Tsuk et al. | |
| 7,333,092 B2 | 2/2008 | Zadesky et al. | |
| 7,345,671 B2 | 3/2008 | Robbin et al. | |
| 7,348,967 B2 | 3/2008 | Zadesky et al. | |
| 2003/0076301 A1 | 4/2003 | Tsuk et al. | |
| 2003/0076303 A1 | 4/2003 | Huppi | |
| 2003/0076306 A1 | 4/2003 | Zadesky et al. | |
| 2003/0095096 A1 | 5/2003 | Robbin et al. | |
| 2005/0179654 A1 * | 8/2005 | Hawkins et al. ........ 345/156 |
| 2005/0198588 A1 * | 9/2005 | Lin et al. ........ 715/784 |
| 2006/0044259 A1 * | 3/2006 | Hotelling et al. ....... 345/156 |
| 2007/0013671 A1 | 1/2007 | Zadesky et al. | |
| 2007/0080936 A1 | 4/2007 | Tsuk et al. | |
| 2007/0080938 A1 | 4/2007 | Robbin et al. | |
| 2007/0083822 A1 | 4/2007 | Robbin et al. | |
| 2007/0085841 A1 | 4/2007 | Tsuk et al. | |
| 2007/0120819 A1 * | 5/2007 | Young et al. ......... 345/156 |
| 2007/0242057 A1 | 10/2007 | Zadesky et al. | |
| 2007/0276525 A1 | 11/2007 | Zadesky et al. | |
| 2007/0290990 A1 | 12/2007 | Robbin et al. | |
| 2008/0018615 A1 | 1/2008 | Zadesky et al. | |
| 2008/0094352 A1 | 4/2008 | Tsuk et al. | |
| 2008/0098330 A1 | 4/2008 | Tsuk et al. | |

OTHER PUBLICATIONS

U.S. Appl. No. 11/378,176, filed Mar. 17, 2006, in the name of David B. Cranfill, entitled "User Interface for Scrolling".

* cited by examiner

*Primary Examiner*—Richard Hjerpe
*Assistant Examiner*—Kimnhung Nguyen (57) ABSTRACT

A scrolling user interface comprises proportional scrolling responsive to contact in a proportional zone of a scrolling strip and multi-mode scrolling in response to contact in a multi-mode zone of the scrolling strip. Multi-mode scrolling can include proportional scrolling, continuous scrolling, or stepped scrolling.

15 Claims, 12 Drawing Sheets

USER INTERFACE AND METHOD THEREFOR

FIELD OF THE INVENTION

The present invention pertains to user interfaces, and more particularly to an improved user interface for navigation.

BACKGROUND OF THE INVENTION

It is highly desirable to provide a scrolling capability for efficiently moving through menus on electronic devices. As the capabilities of user devices improve, the need for more efficient scrolling increases. This is due to a variety of technological changes. Devices have ever increasing functionality as technologies converge on single platforms. Computers, mobile phones, personal digital assistants, music players, video players, televisions, and network technology are being encompassed on a single device. Larger memories and improved power performance have enabled users to store more information, allowing users to create larger collections of music, videos, contact lists, or the like.

Devices for performing these functions are being built smaller and smaller, such that it is necessary to manipulate large menus and libraries with small user interface and display. In many devices, it is highly desirable to support a scrolling input around the navigation area, to facilitate navigation in lists such as phone books and music or video libraries.

What is needed is a new user interface for improving the user experience when using in portable devices.

BRIEF DESCRIPTION OF THE DRAWINGS a. The present invention is illustrated by way of example and not limitation in the accompanying figures, in which like references indicate similar elements, and in which.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

Before describing in detail embodiments that are in accordance with the present invention, it should be observed that the present invention resides primarily in combinations of method steps and apparatus components related to the communication device, communication node, and method for transmitting a message. Accordingly, the apparatus components and method steps have been represented where appropriate by conventional symbols in the drawings, showing only those specific details that are pertinent to understanding the present invention, so as not to obscure the disclosure with details that will be readily apparent to those of ordinary skill in the art, having the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It is desirable to include a very effective scrolling function that occupies the same surface area and volume as a typical directional navigation interface. It is further desirable to have the directional four-way navigation plus selection keys separate from the scrolling keys.

Figure 1:
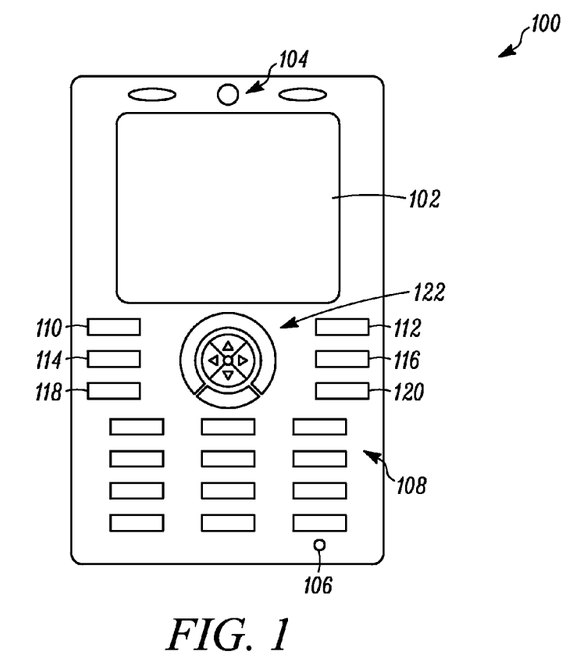
FIG. 1 illustrates a communication device.

A device 100 is illustrated in FIG. 1. The device 100 is illustrated as a mobile communication device, such as cellular telephone for a wide area network (WAN) or internet phone for a wireless local area network (WLAN). However, those skilled in the art will recognize that the device could alternately be any device that a user manipulates to control movement on a screen or scrolling through a list, such as a computer, a video device (portable or fixed terminal such as a home television), a music device (MP3 player), or a the like. The device 100 includes a display 102, a speaker port 104, a microphone port 106, and a keypad 108 in housing 101. The keypad includes a traditional 4 row by 3 column telephone key arrangement for the numbers 0-9, and the characters * and #. These keys may also have letters or stroke characters, as is known. Soft keys 110 and 112 are positioned below the display. The function associated with the soft keys changes depending on the mode of the device, and the function at any particular time will appear on the display 102 adjacent the keys. Function keys 114 and 116 are positioned below the soft keys, and may for example comprise dedicated function keys, such as those for activating music player or a camera. The send key 118 and end key 120 are illustrated below the function keys.

A navigation and scroll user interface 122 is positioned on the front surface of the device 100 for user navigation of images, menus, and lists presented on the display. The device 100 thus includes a menu system that produces images, menus, and/or lists presented in display 102. Although the illustrated device includes the keypad 108, it is envisioned that fewer or more control elements could be provided with the navigation and scroll user interface, and further that the navigation and scroll user interface can be the exclusive control for the device.

Figure 2:
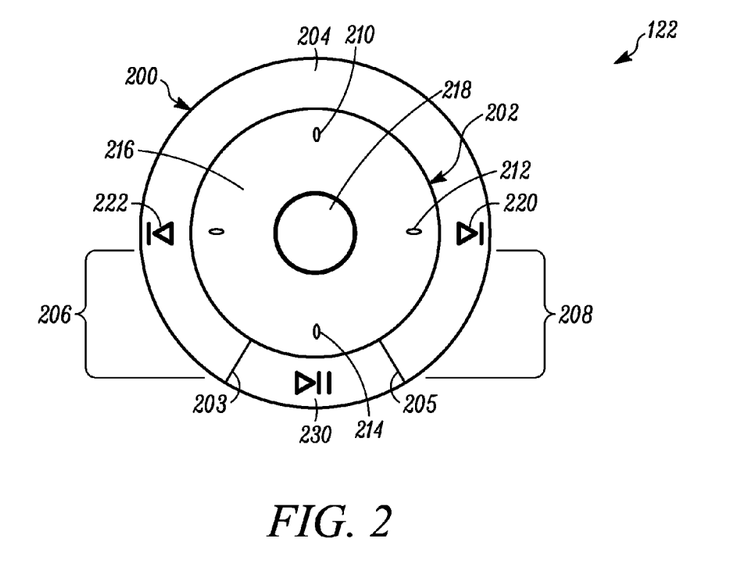
FIG. 2 illustrates a scrolling and navigation user interface.

At any rate, a first embodiment of a navigation and scroll user interface 122 is illustrated in FIG. 2. The user interface 122 includes a scroll strip 200 and a directional navigation input 202. The illustrated scroll strip 200 comprises a circular strip that partially circumscribes the directional navigation input 202. The illustrated scroll strip is a touch sensitive device, and may be implemented using one or more capacitive sensor, one or more resistive sensor, or any other suitable sensor. The illustrated scrolling strip does not completely circumscribe the navigation input, but has a first end 203 and a second end 205 at opposite ends of the strip. An optional, additional touch sensitive "key" 230 is positioned between ends 203 and 205 and completes the circle circumscribing the navigation device 202. The key 203 can be a sensor region, a mechanical switch, or any other suitable construction.

It is thus envisioned that the scroll strip can be implemented using touch pad technology, such as resistive or capacitive sensing technologies. For example, very thin touch sensing stacks can be used to detect the digit presence, allowing the scrolling device to be implemented on very thin devices. It is alternatively envisioned that mechanical switches could be used to implement the scrolling strip.

As used herein, keys can be individual keys, such as mechanical switch assemblies, which may for example include a physical key that activates a poppel associated with a printed circuit board. Alternatively, a key can be an area of a touch sensor, such as a labeled surface over a capacitive or resistive sensor. Such sensors can detect "contact" or "contacting" when a digit is very close proximity to the surface of the sensor or actual contact with the surface of the sensor, depending upon the sensitivity of the sensor. Those skilled in that are recognize that a large variety of different key technologies are commercially available for implementing a key, or key arrangement referred to herein generally as a keypad.

The illustrated scroll strip 200 has three zones. A proportional zone 204 is for proportional scrolling, wherein the rate and direction of movement of the user's digit, such as a finger or pointer (for example a rod), around the strip results in a corresponding rate and direction of vertical menu scrolling. For example, slow movement of the digit across the surface of proportional zone 204 in a clockwise direction will cause the device to slowly move down a menu or list visual on display 102. Faster movement of the digit across the proportional zone 204 in the clockwise direction will cause the device to move quickly down the menu or list. Slow digit movement in the counterclockwise direction across the proportional zone 204 in the counter-clockwise direction will cause the device to move slowly up a menu or list on display 102. Faster movement of the digit across the proportional zone 204 in the counter-clockwise direction will cause the device to move quickly up the menu or list displayed. In the proportional zone 204, the scrolling of the menu requires movement of a digit. The distance that the digit moves will result in a proportional number of lines moving vertically on the display. If the digit stops moving across the proportional zone 204, the menu will stop scrolling.

A reverse multi-mode zone 206 is positioned at first end 203 of scrolling strip 200, and extends from the proportional zone 204 to the end 203. A forward multi-mode zone 208 is positioned at the other end 205 of the proportional scrolling strip 200 and extends from the proportional zone 204 to the second end 205. The multi-mode zones 206 and 208 can have fixed or variable lengths, as described in greater detail herein below. It is envisioned that in the preferred embodiment, the multi-mode zones 206 and 208 provide both continuous and proportional scrolling because this provides a more intuitive user experience. However, the zones 206 and 208 can alternatively provide only non-proportional scrolling in these zone. For example, the distance moved into the zones 206 and 208 could determine the rate of scrolling such that the further the digit moves from the boundary, the faster continuous scrolling occurs.

One preferred embodiment will be described in general in this paragraph, and in greater detail herein below. When the user slows movement of a digit in the multi-mode zones 206 and 208, the menu will continue scrolling at a rate determined by the speed at which the digit was last moving before the digit speed dropped below the threshold. The user can thus move a digit into the multi-mode zone 206 very quickly and leave their digit on the zone to achieve rapid continuous scrolling without digit motion to search for an item on a long list. If the user moves a digit into a multi-mode zone and lifts it up, the menu will scroll until the digit is lifted at which time the scrolling will stop. If the user moves in the multi-mode zone without stopping, the menu will scroll at a proportional rate.

As will also be described in greater detail herein below, the multi-mode zones 206 and 208 can also be used for accelerated scrolling responsive to tapping. For example, each time the user taps the multi-mode zone 208, the menu can move to the next letter. In this way, if the first letter of an item displayed by the menu is an A, tapping the multi-mode zone 208 once will move the menu to the first item beginning with the letter B. Tapping the multi-mode zone 208 again will move the menu to the first item beginning with a C. Tapping the multi-mode zone again will move the menu to the first item beginning with a D. In this way, the user can tap through the alphabet. If the menu is displaying a work beginning with the last letter of the alphabet represented by the list, such as a word beginning with the letter Z, tapping the multi-mode zone 208 will move the menu back to the beginning of the list, such as a title beginning with a number or the letter A. It is envisioned that items beginning with a number will be ahead of items beginning with the letters A through Z. Alternatively, items beginning with a number could be behind items beginning with a letter.

Tapping the multi-mode zone 206 has a similar effect as tapping the multi-mode zone 208, except that the tapping will move the menu backwards through the listing by letter. For example, if the current cursor is on an item beginning with the letter B, tapping multi-mode zone 206 will cause the cursor to move to the first item in the menu beginning with the letter A.

It is envisioned that tapping the multi-mode zones could result in stepping through any index. For example, a tap could cause the menu to move sequentially to a next or previous category. It is also envisioned that tapping could move the menu by a fixed predetermined number of lines.

An optional five-way navigation interface 202 is illustrated inside the scroll strip 200. The five-way navigation interface 202 includes an up key 210, a right key 212, a down key 214 and left key 216. A select key 218 is positioned in the center. The five-way navigation interface 202 can be implemented using mechanical switches, such as so-called popple switches, or touch sensors such as resistive or capacitor sensors, or any other suitable means. The scroll strip and navigation interface can be implemented using a common mechanical, capacitive, or resistive sensor array, or a combination of mechanical and electrical touch sensors.

For a music or video mode functionality, the scroll strip 200 also supports music function keys. In particular, the scroll key includes fast forward 220 and fast reverse 222, which may be zones, or regions, of the strip. A dedicated play/pause 230 is provided at the bottom of the scroll strip and completes the ring.

Figure 3:
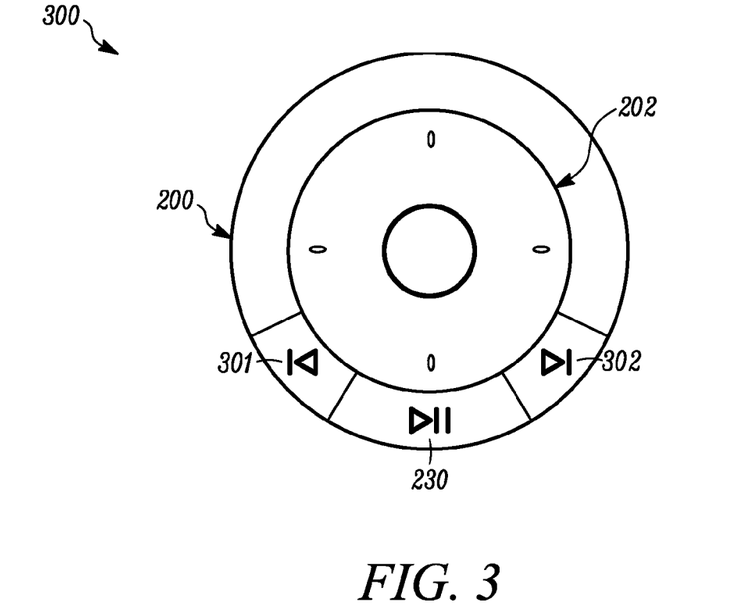
FIG. 3 illustrates an alternate scrolling and navigation user interface.

FIG. 3 discloses a first alternative design for the scroll and navigation user input 300. In this embodiment, the fast forward 301, fast reverse 300, and pause/play 230 are dedicated keys or regions at the bottom of the scroll strip 200. The embodiment 300 is otherwise the same as scroll and navigation user interface 122.

Figure 4:
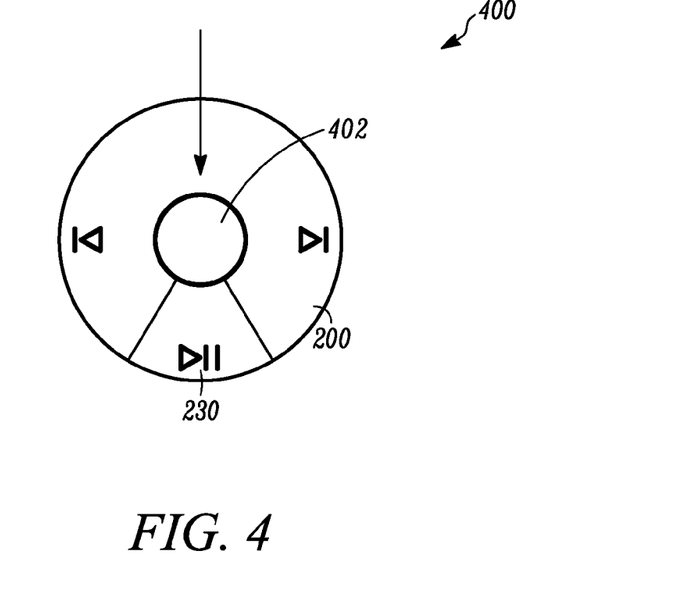
FIG. 4 illustrates another alternate scrolling and navigation user interface.

FIG. 4 discloses another alternative embodiment of a scroll and navigation user input 400. User input 400 can include a joystick, such as a 5-way joystick 402 positioned inside in the center of the navigation strip 200. A 5-way joystick rocks to permit up, down, right and left navigation, as well depression such as z-axis actuation, whereby the user can press the joystick straight down to "select" or "enter". This embodiment permits the overall surface dimensions of the scroll and navigation input to be reduced, or allows the scroll strip to be wider in the same footprint as the scroll and navigation user input 122. Those skilled in the art will recognize that a joystick permitting more directions of manipulation could be employed without departing from the invention.

Figure 5:
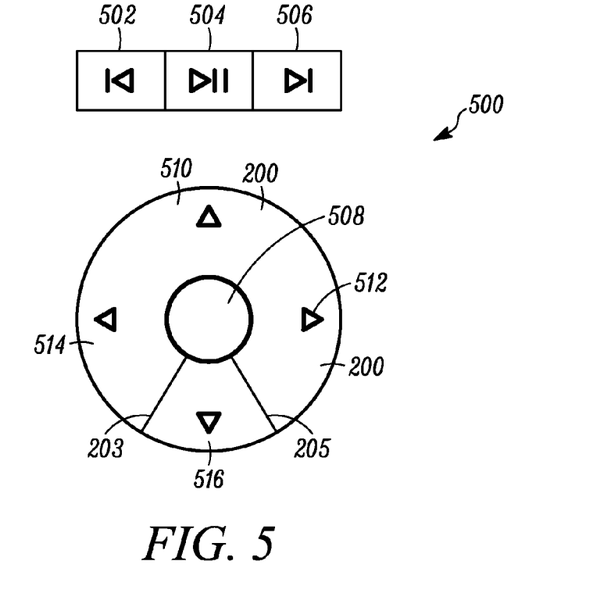
FIG. 5 illustrates an alternate scrolling and navigation user interface.

FIG. 5 discloses another alternative embodiment of a scroll and navigation user input 500. This embodiment includes dedicated music or video transport keys 502, 504 and 506 positioned remote from the navigation and scroll keys. The scroll strip 200 partially circumscribes the center select key 508. The up key 510, right key 512, and left key 514 are integrated on the scroll strip. The down key 516 is a separate key between the ends 203 and 205 of the scroll strip 200.

Figure 6A:
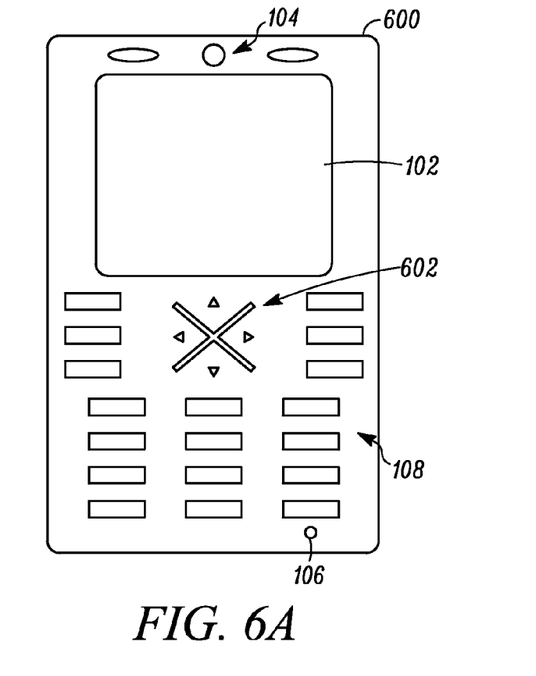
FIG. 6A illustrates a communication device with another alternate scrolling and navigation user interface.
Figure 6B:
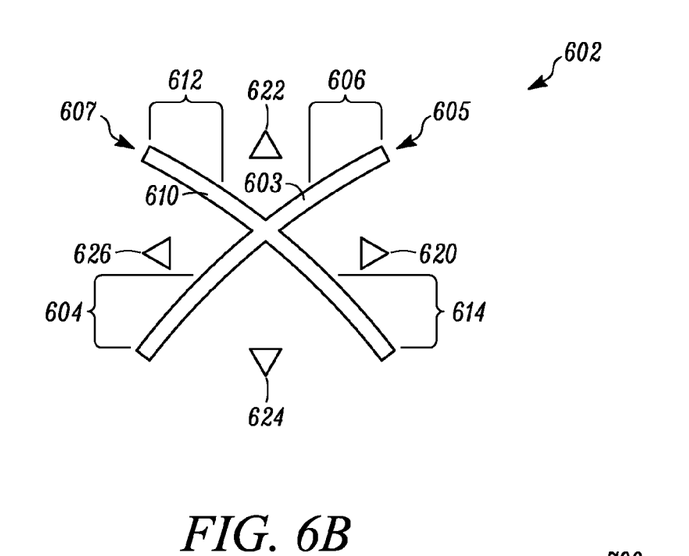
FIG. 6B illustrates the alternate scrolling strip of the communication device of FIG. 6A.

A communication device 600 FIG. 6 includes yet another alternate embodiment of the scroll strip and navigation user interface 602. The scroll function is implemented using a right handed scroll strip 605 and left handed scroll strip 607. The right handed scroll strip 605 includes a first multi-mode zone 604, a proportional scrolling zone 603 and a second multi-mode zone 606. The scroll strip 605 extends upwardly from right to left at an angle which is readily positioned for a user's right thumb to traverse while the user is holding the device 600 in their right hand. The scrolling strips form crossing arms generally in the shape of an "X" and which arms may be straight or arced.

The left handed scroll strip 607 is implemented using a right to left downwardly extending strip having a multi-mode zone 612, a proportional zone 610 and a multi-mode zone 614. The left handed scroll strip 607 extends upwardly from right to left at an angle which is readily positioned for a user's left thumb to traverse while the user is holding the device 600 in their left hand.

The scrolling and navigation device 602 includes right navigation key 620, up navigation key 622, left navigation key 626 and down navigation key 624. The navigation keys permit the user to navigate around the display. The center of the scroll strips can be context aware to operate as the enter/select button.

Figure 7:
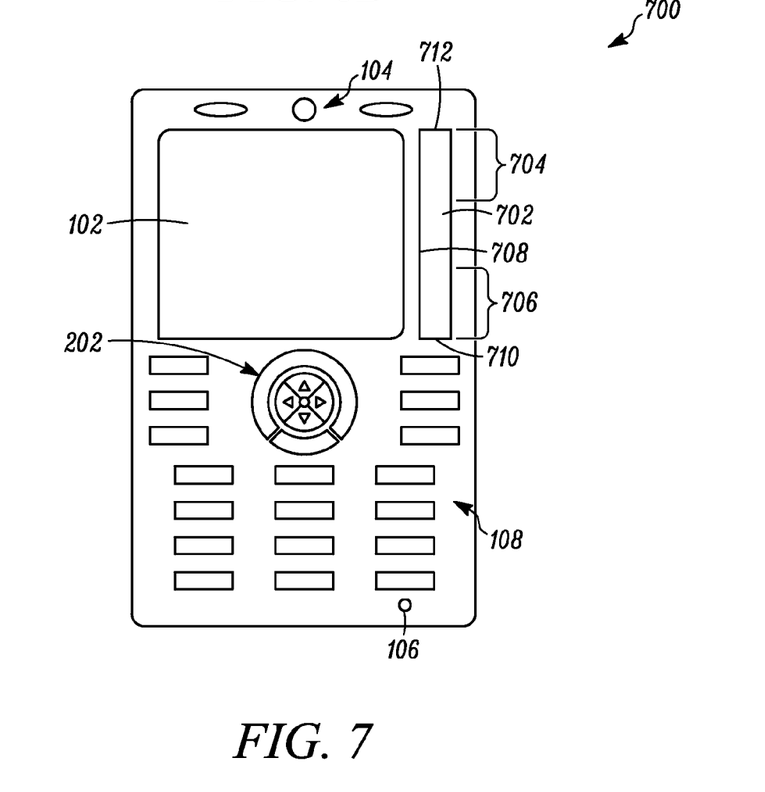
FIG. 7 illustrates a communication device with another alternate scrolling and navigation user interface.

A communication device 700, FIG. 7, discloses yet another embodiment of a scrolling and navigation user interface, including a scrolling strip 702 and a 5-way navigation user interface 202. The scrolling strip includes a multi-mode zone 706 at a first end 710 and a multi-mode zone 712 at a second end 712. The first multi-mode zone 706 is for downward non-proportional rate scrolling, and the second multi-mode zone 704 is for upward non-proportional scrolling. The operation of the multi-mode zones 706, 604, 612, and 206 are the same. The operation of multi-mode zones 704, 606, 614 and 208 are the same. The operation of the proportional zones 708, 603, 610, and 204 are the same. For brevity, each of these zones will not be described individually.

It is envisioned that the scrolling and navigation user interface 702, 202 in FIG. 7, 602 in FIG. 6, 500 in FIG. 5, 400 in FIG. 4, 300 in FIG. 3, and 122 in FIG. 1, can be implemented using touch sensitive technology, such as resistive or capacitive sensing technologies. For example, very thin touch sensing stacks can be used to detect digit presence, allowing the scrolling strip and navigation device to be implemented on very thin products. It is alternatively envisioned that mechanical switches, or a combination of touch sensors and mechanical switches, could be used to implement the scrolling and navigation interface. For example, the scrolling strips can be implemented using touch sensors and the navigation keys implemented using mechanical switches.

The operation of the improved user interface will now be described with reference to FIGS. 8-14. The operation enables rapid and intuitive scrolling through large amounts of data, such as phone lists, music, videos, and the like. It also maintains traditional navigation functions which users expect in a multi-modal device. The need for a user to perform repetitive motion can be reduced, while enabling the small surface footprint and low volume desired for implementing the navigation and control user interface on a compact portable device.

Figure 8:
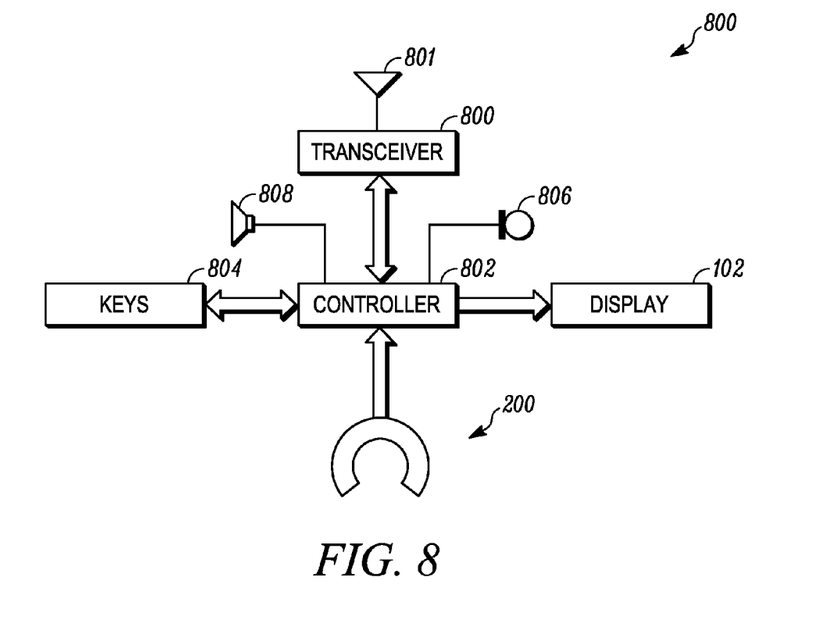
FIG. 8 is a circuit in block diagram form for the communication devices.

A circuit 800 is illustrated in block diagram form in FIG. 8. The illustrated circuit is for a radio communication device. The circuit includes an antenna 801, a transceiver 800, a microphone 806, a speaker 808, a controller 802, a display 102, keys 804, and scroll strip 200. The transceiver would not be required if the scroll strip is not associated with a communication device. The controller can be implemented using a digital signal processor, controller, microprocessor, microcontroller, programmable logic unit, discrete circuits, or the like, or a combination thereof. As noted above, the keys can be implemented using distinct or integrated physical switches, touch sensors, or a combination thereof.

Figure 9:
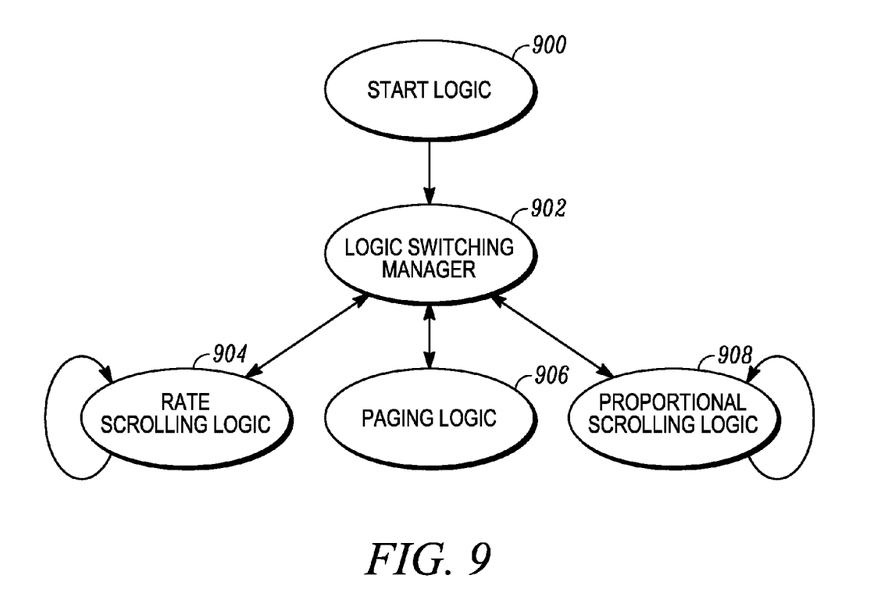
FIG. 9 illustrates the states for the user interface in the circuit according to FIG. 8.

With reference to FIG. 9, the controller 802 start logic 900 initiates that device in a conventional manner. The start logic is described in more detail with reference to FIG. 10. Once initiated, the logic switching manager 902 transitions between rate scrolling 904, page logic 906, and proportional scrolling 908 depending upon how the user is interacting with the scrolling strip.

Figure 10:
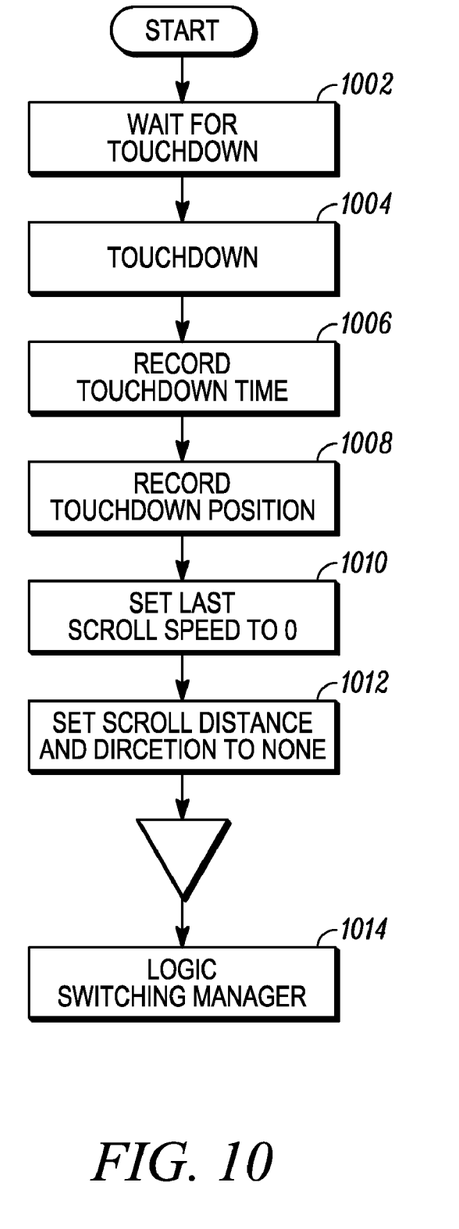
FIG. 10 illustrates the start logic for the user interface in the circuit according to FIG. 8.

With reference to FIGS. 8 and 10, the controller 802 is in a standby state 1002 waiting for a digit contact with the scrolling strip 200 as detected at step 1004. Touchdown occurs when an object, such as a finger or pointer, touches the scrolling strip 200. When a touchdown event is detected, the time is recorded at step 1006, the position on the strip is noted at step 1008, the "last" scroll rate is set to zero at step 1010, and the scroll distance and direction are set to "none" at step 1012. The device is then initiated for the logic switching manager function at step 1014.

Figure 11:
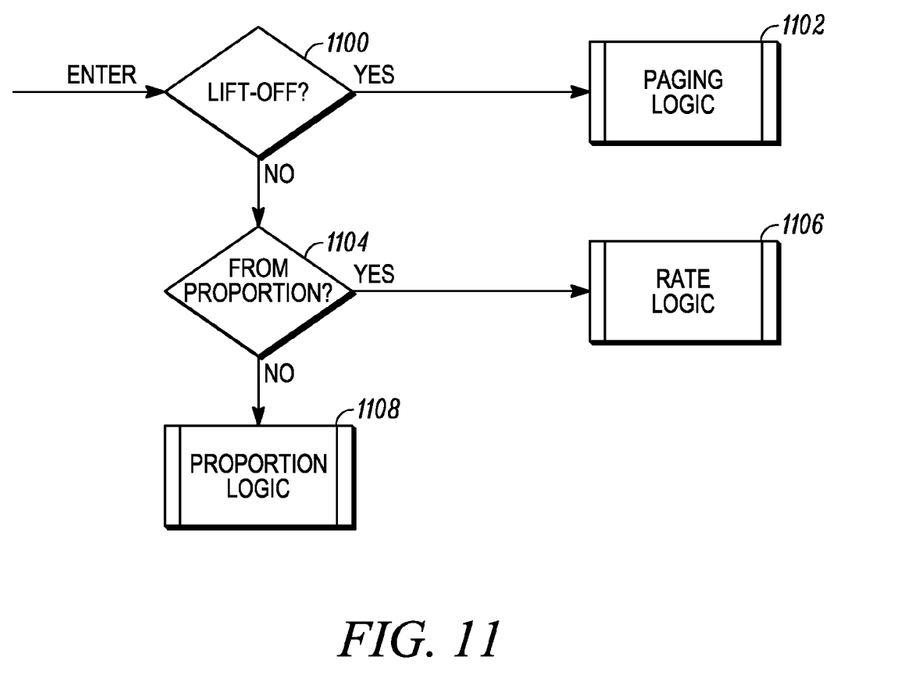
FIG. 11 illustrates the logic switching manager for the user interface in the circuit according to FIG. 8.

The logic switching manger operation is illustrated in FIG. 11. Upon entering the logic manager, the controller 802 detects a lift-off event in step 1100. Detection of lift-off in a multi-mode zone indicates the user has lifted the digit in contact with the scrolling strip and that the user may be tapping a multi-mode zone to step rapidly though a list, such that the paging logic is executed as indicated at step 1102. Paging, or step scrolling, can be stepping a page size in a program where pages are defined, or by a predetermined block size such as 10 entries or screen lines, 20 entries or screen lines, 30 entries or screen lines, or any other suitable incremental amount. Alternatively, paging can be stepping through the alphabet or another indexing element such as album names, genres, musician by names, actor by names, directors, or any other suitable indexing category.

If the digit is not lifted off, as determined at step 1100, and the user moves from the proportional zone into the multi-mode zone, as determined at step 1104, the rate logic 1106 is executed to determine the multi-mode zone behavior. If the digit remains in the proportion zone, the controller 802 executes the proportion logic 1108.

Figure 12:
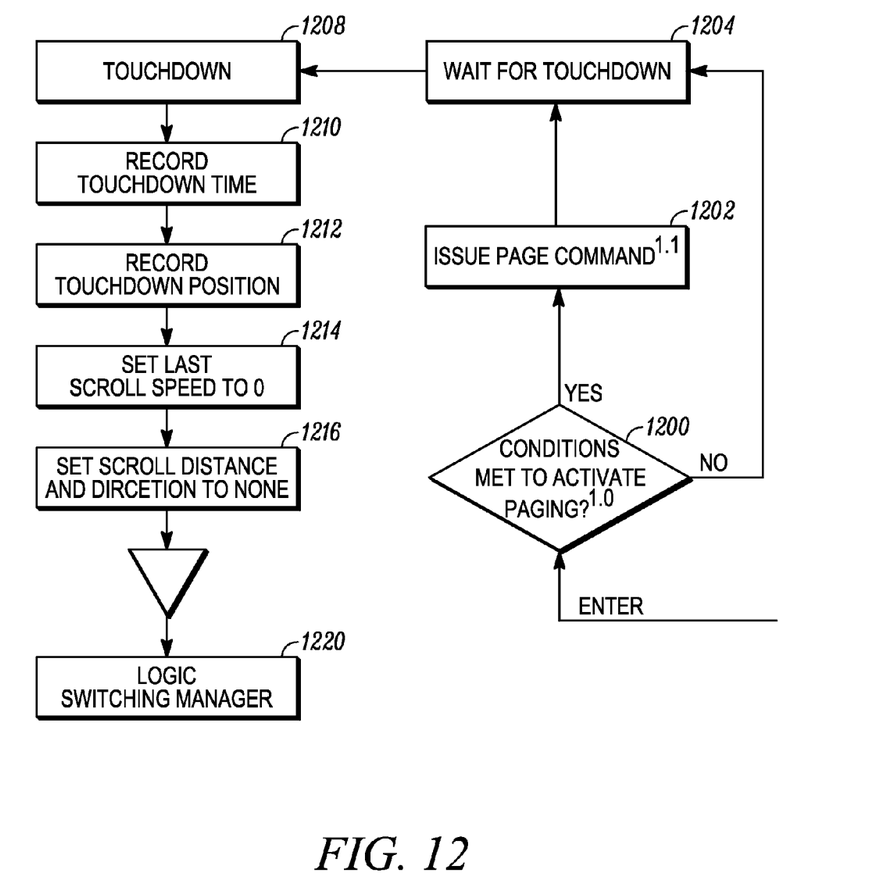
FIG. 12 illustrates the paging logic for the user interface in the circuit according to FIG. 8.

The paging logic will now be described with respect to FIG. 12. Initially, the controller 802 determines if the conditions to activate paging are met in step 1200. For paging to be active, the following conditions must be met:
  touchdown and lift-off positions must be within a specified range of the strip (for example must occur in a multi-mode zone);
  lift-off time and touchdown time must be within a predetermined value (a value should be selected such that tapping is detected without over triggering responsive to a press and hold); and
  a scroll can not occur between touchdown and lift-off.

If any of the three conditions are not met, the controller proceeds to step 1204 to wait for touchdown. If all three conditions are met, then the page command is generated in step 1202. Paging is defined as scrolling a set number of lines or scrolling to a next index point, such as the next letter of the alphabet. Touchdown is detected at step 1208. The touchdown time is stored at step 1210. The touchdown position is noted at step 1212. The previous scroll rate is set to 0 in step 1214. The scroll distance and direction are set to "none" in step 1216. The program returns to the logic switching manager in step 1220.

Figure 13:
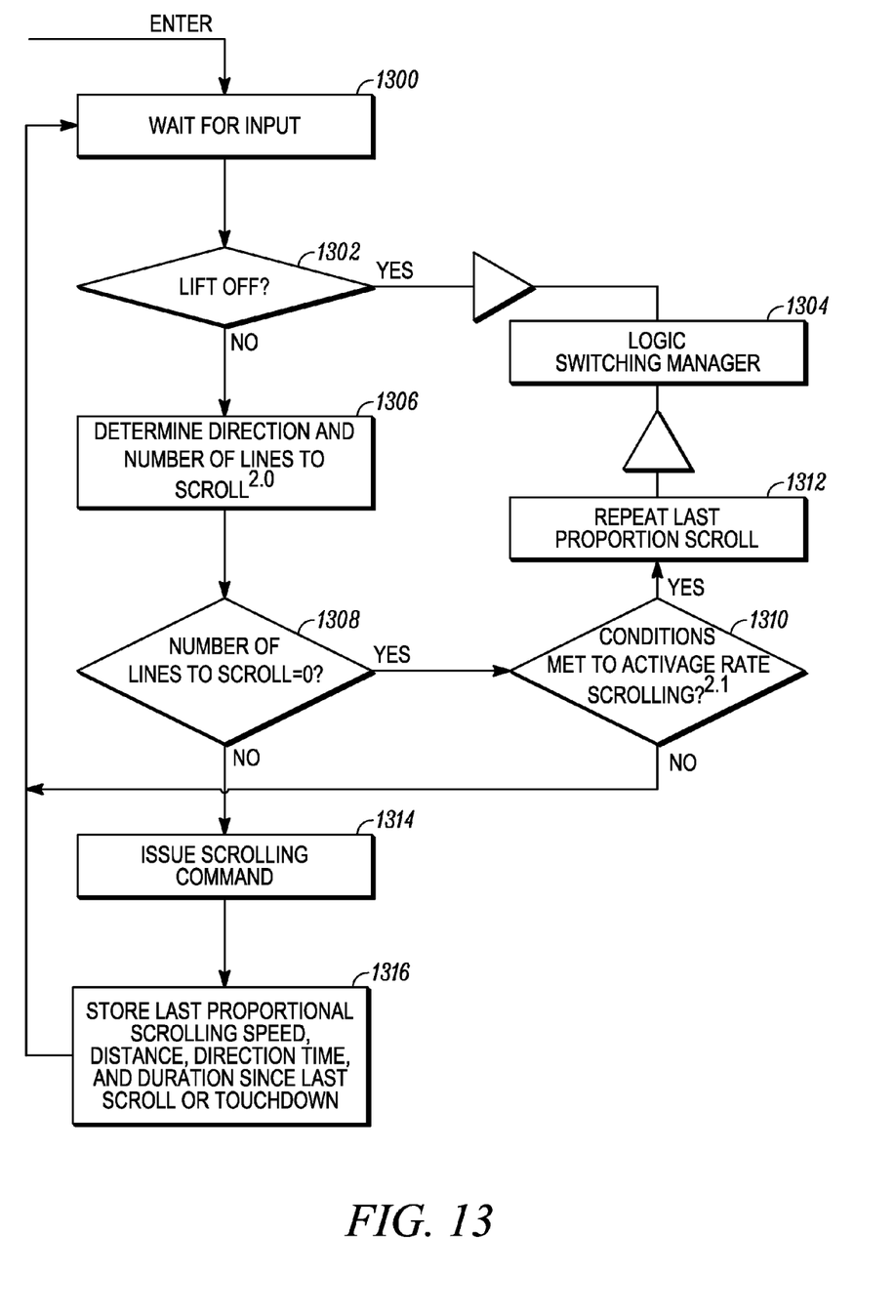
FIG. 13 illustrates the proportion logic for the user interface in the circuit according to FIG. 8.

Proportional scrolling is shown in FIG. 13. Initially, the controller 802 waits for input in step 1300. If the controller detects lift-off in step 1302, indicating the user tapped the sensing strip, it exits proportion scrolling mode and returns to the logic switching manager at step 1304 to transition to paging logic. It will be recognized that other gestures could be used to pass control to the paging logic, such as press and hold, double tap, or any other suitable gesture. If lift-off is not detected at step 1302, the controller determines at step 1306 the direction and number of lines to scroll. The digit moving speed profile will determine a value, represented by variable x, which is a rate variable, to set the proportion of menu movement for a particular distance of digit travel. The value x is thus the ratio of digit movement distance to screen display movement distance. Those skilled in the art will recognize that the value x can depend on the display 102 size, the scrolling strip 200 size, and will be selected such that a movement across the scrolling strip produces a rate that permits the user to see the items that are scrolled while the menu moves through the list. The number of lines to scroll will equal the distance D of digit travel divided by the variable x (D/x).

If it is determined in step 1308 that the number of lines to scroll is 0, the controller determines whether the conditions are met to activate rate scrolling in step 1310. All of the following conditions must be met to activate rate scrolling:
  digit is at rest (or near at rest; this is calculated by current time minus last scroll time is greater than or equal to the last scroll duration) in the rate activation zone (range of positions on the sensor corresponding to the multi-mode zone where rate activation occurs);
  last portion scroll rate greater than 0; and
  last scroll direction matches rate activation zone direction (left-to-right movement in the right multi-mode zone and right-to-left movement in the left multi-mode zone).

It is envisioned that an alternate embodiment may use some type of gesture (e.g., stop) in place of, or in conjunction with, a rate activation zone (that may have an associated directionality) as one of the conditions for activating rate scrolling. If rate scrolling conditions are met as determined at step 1312, the controller repeats last proportion scroll in step 1312 and exits proportion logic scrolling to return to the logic switching manager in step 1304 and transition to rate scrolling.

If the conditions are not met for rate scrolling as determined at step 1310, following determination of a 0 distance, the controller returns to step 1300 to wait for an input.

If it was determined in step 1308 that the number of lines to scroll does not equal zero, the scrolling command is issued in step 1314. The controller will then store the last proportional scrolling rate, distance, direction time, and direction since last scroll or touchdown in step 1316, and return to step 1300 to wait for the next input.

Figure 14:
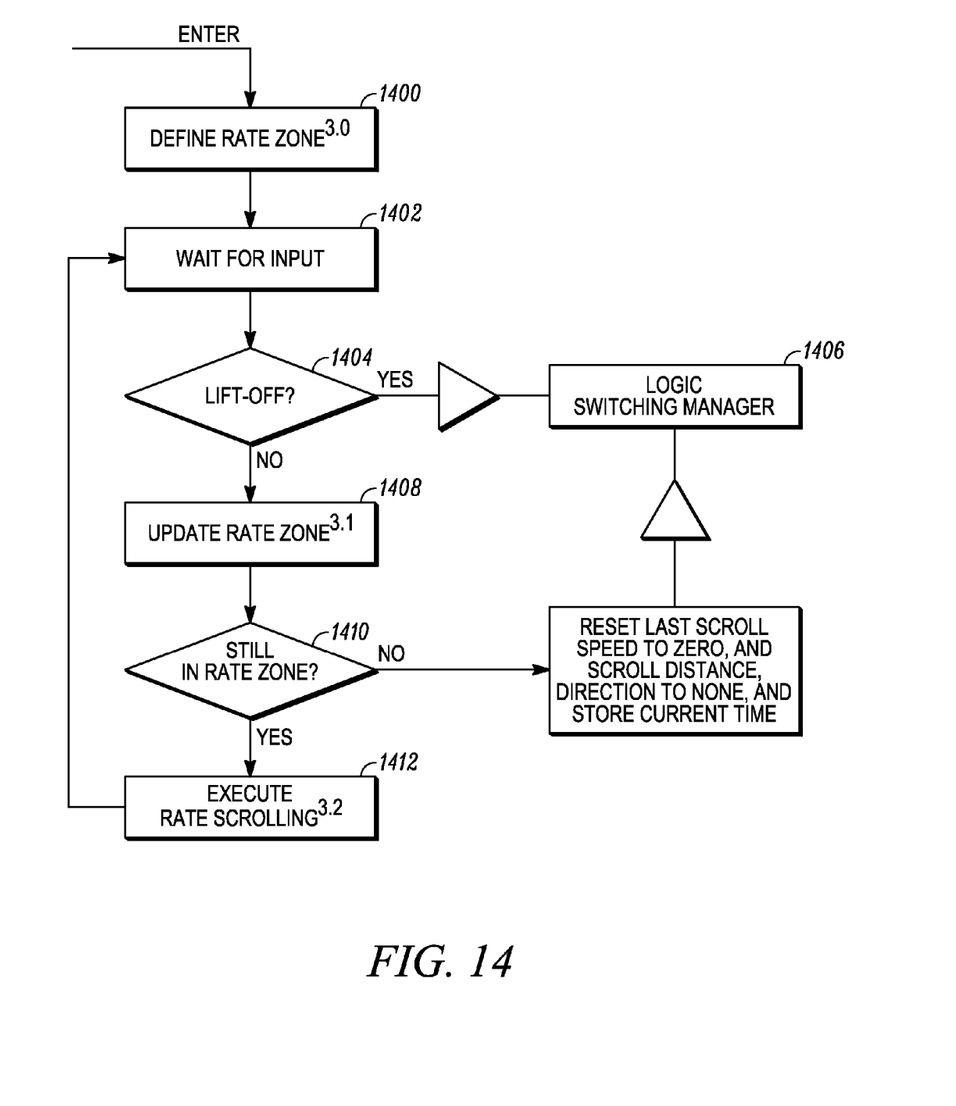
FIG. 14 illustrates the rate scrolling for the user interface in the circuit according to FIG. 8.

The rate scrolling logic is illustrated in FIG. 14. Initially, the multi-mode regions is defined, or set, in step 1400. The multi-mode region is the area on the sensor in which continuous scrolling occurs. The multi-mode zone will be described with reference to FIGS. 15-17. The exemplary strip 1500 is straight only for purposes of simplifying the explanation, but those skilled in that art will recognize that the explanation applies also to an arcuate strip, such as a round, oval or u-shaped strip. Regardless of the shape of the scroll strip, the operation of the proportional and multi-mode zones is equally applicable.

Figure 15:
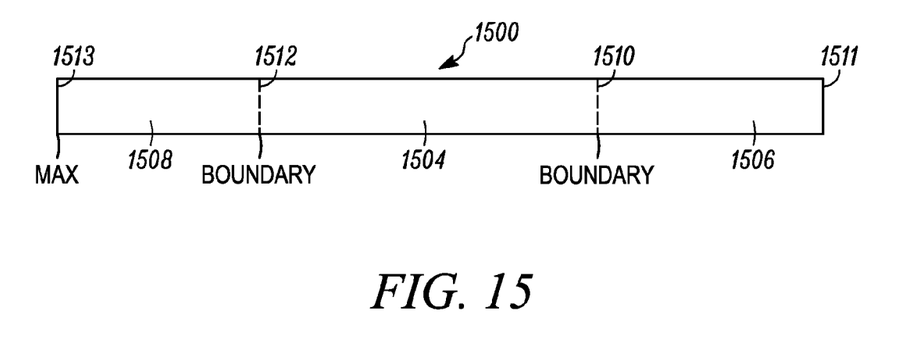
FIG. 15 illustrates a straight scrolling strip.
Figure 16:
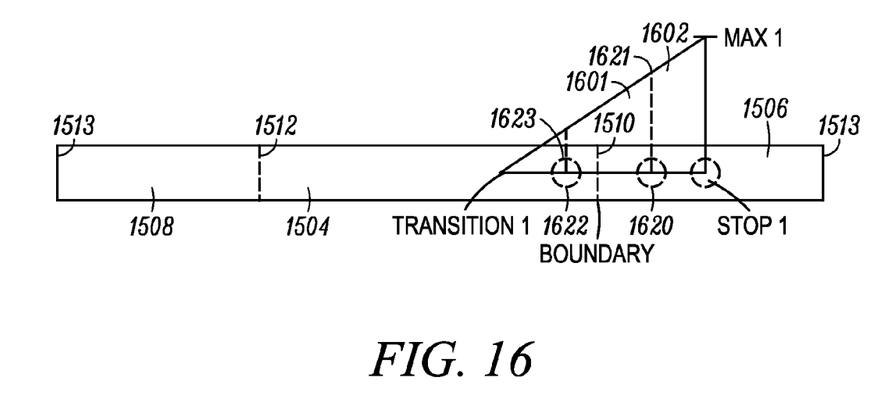
FIG. 16 is a functional diagram illustrating the multi-mode variable rate region.

A first, or right, multi-mode zone 1506 extends from the right boundary 1510 to the end 1511 of the scrolling strip 1500 in FIG. 15. A second, or left, multi-mode zone 1508 extends from the left boundary 1512 to the end 1513 of the scrolling strip 1500. Contact in the multi-mode zones can produce proportional mode (proportional scrolling), continuous mode (scrolling occurs without digit movement), or page mode (scrolling is stepped by predetermined increments such as an index number of screen lines for each tap). The boundaries thus demark the transition point between the portions 1506, 1508 of the scroll strip 1500 in which rate and page scrolling can be initiated and the portion 1504 of the scroll strip in which rate and page scrolling can not be initiated. Rate and page scrolling can not be initiated in the proportional zone 1504.

More particularly, continuous scrolling in the multimode zone occurs when there is digit movement on the strip in multi-mode zones 1506, 1508 that starts out above a threshold speed and falls below the threshold speed without lifting off from the strip. The scrolling rate will be determined by the last speed of digit movement measured prior to stopping. Thus, the conditions for continuous movement in the right multi-mode zone 1506 are: movement in the multi-mode zone 1506 in the direction away from the boundary 1510 toward the end 1511, continuous contact of a digit on the scroll strip 1506, and reduction in digit movement speed to below a threshold (which can rest or near at rest) in the multi-mode zone 1506. If these conditions are met, continuous screen scrolling will occur without additional digit movement. Similarly, the conditions for continuous screen scrolling in the left multi-mode zone 1508 are: movement in the multi-mode zone 1508 in the direction away from the boundary 1512 toward the end 1513, continuous contact of a digit on the scroll strip in the multi-mode zone 1508, and reduction in digit movement speed to below a threshold (which can rest or near at rest) in the multi-mode zone 1508. If these conditions are met, continuous scrolling will occur.

Variable continuous scrolling can advantageously be provided. Variable continuous scrolling means that the user can move the digit in contact with the scroll strip to change the rate of continuous scrolling. A dynamic variable rate region is illustrated by triangle 1601 (FIG. 16), having a transition point TRANSITION1, a stop-point STOP1, and a maximum continuous scroll rate MAX1. The stop-point is the location in the multi-mode zone where the speed of the user's digit movement dropped below the threshold speed of digit movement, which will be the initial distal end of the rate region. The maximum rate MAX1 is the maximum rate the menu will keep moving, and is set to the last rate measurement taken prior to digit movement dropping below the speed threshold (e.g., the previous scroll rate stored in steps 1214 or 1316). The maximum rate MAX1 is thus a function of, or derived from, the previous rate of scrolling prior to initiating continuous scrolling, and it is associated with a contact position on the scroll strip 1500 located at the stop point STOP1. The user can slow down the rate of continuous scrolling by moving from the stop point STOP1 toward the transition point TRANSITION1. The rate of continuous movement will drop linearly with movement of the digit along the strip, until the transition point TRANSITION1 is reached. The transition point is the lowest rate of continuous scrolling. If the user moves their digit to the left of TRANSITION1, the menu will return to proportional scrolling. The region is dynamic in that it varies. It can vary in scroll strip size, location and/or the rate of scrolling.

The slope of the triangle and the transition point are a function of the maximum rate MAX1, and thus are derived from the maximum rate. The maximum scrolling rate MAX1 may be any suitable rate, such 50 lines per second in FIG. 16. The faster the maximum rate, the steeper the slope 1602 will be, and the longer the distance between the transition point TRANSITION 1 and the stop point STOP1. The continuous scrolling rate will vary depending upon where the digit contacts the scrolling strip in the variable rate continuous scrolling region. More particularly, if after coming to rest at STOP1, the user moves their digit to position 1620 and holds it there, the rate of continuous scrolling will be reduced to a rate 1621, such as 40 lines per second. Thus the menu will keep scrolling, but at a lower rate. By moving the digit to position 1622 and holding it, the rate will be further reduced to rate 1623, such as 30 lines per second. The user can move the digit to the right or left, and it will continue scrolling at a rate that varies along as represented by the slope 1602, as long as the user stays on the strip between the transition point TRANSITION1 and the stop point STOP1.

Figure 17:
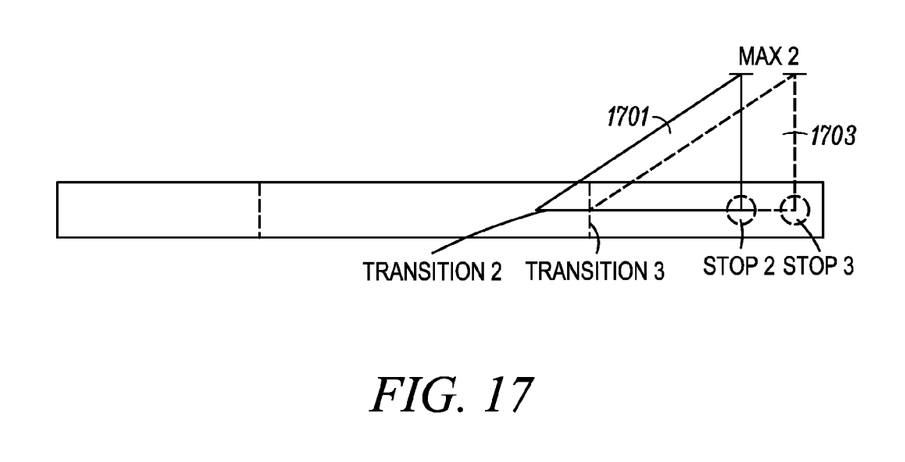
FIG. 17 is a functional diagram illustrating the multi-mode variable rate region.

FIG. 17 illustrates two additional aspects of the variable continuous scrolling region. First, the rate MAX2 is faster than MAX1, indicating that the digit was moving faster prior to dropping below the speed threshold (or coming to rest). The rate MAX2 may for example be 80 lines per second. As can be seen, the slope is steeper, and the length of continuous variable rate region is greater. The rate will decrease rapidly with distance to the transition rate. Secondly, FIG. 17 illustrates that the user can move the region to the right. After establishing position STOP2, if the user moves further to the right (beyond STOP2 toward the end of the strip 1511), and then again stops at STOP3, the variable region will move to position 1703. The region characteristics (slope and length) will not change, such that the transition point will also move to the right to point TRANSITION3. Thus the distance between the stop point and the transition point does not change, and the slope will not change, as the triangle shift right. Though not described in greater detail for brevity, the multi-mode zones operate the same, although they are mirrors of one another.

The following movement in the multi-mode zones 1506 and 1508 will result in proportional scrolling:
  movement to the left in right multi-mode zone 1506 (from the end 1511 toward boundary 1510), or movement to the right in left multi-mode zone 1508 (from the end 1513 toward the boundary 1512); or
  movement in the multi-mode zone that does not fall below the speed threshold; or
  movement in the multi-mode zone that never exceeds the speed threshold.
  Any of these conditions will result in proportional scrolling.

The following movement in the multi-mode zones 1506 and 1508 will result in page scrolling in the multimode zones: brief contact with the surface of the multi-mode zone. Brief contact means that the contact is less the time threshold. The time threshold is used to distinguish tapping from continued contact that would result in proportional scrolling or rate scrolling.

Thus, the multi-mode zone has the following characteristics:
  if a user contacts the strip in the proportional zone 1504 and moves into the multi-mode zone 1506 or 1508, and then stops moving while maintaining contact with the scroll strip, the menu or list displayed will continue to scroll at a rate equal to the last rate measurement prior to stopping;
  if the user puts the digit down in the multi-mode zone 1506, moves the digit toward the boundary 1510, proportional scrolling will occur;
  if the user puts the digit down in the multi-mode zone 1508, moves the digit toward the boundary 1512, proportional scrolling will occur;
  if the user moves a digit across the multi-mode zones without stopping, proportional scrolling occurs;
  if the user is moving toward end 1511 in the multi-mode zone 1506 or moving toward end 1513 in zone 1508, and then stops moving while still in the multi-mode zone, the menu or list will continue to scroll at the rate associated with the last speed measurement before the digit stopped moving;
  the display will continue to scroll through a list or menu at the same rate as the menu was moving just prior to the user stopping their digit movement until the user moves their digit back toward the boundary;
  the user can stop the scrolling by lifting the digit from the scroll strip; and
  tapping the digit in the multi-mode zones will result in paging.

The multi-mode zone will now be described with reference to FIG. 14. The controller 802 waits for an input in step 1402. If the next event is determined to be a lift-off in step 1404, the controller exits the rate scrolling logic and goes to the logic switch state to await another input as indicated in step 1406. If the next event is a non-lift-off movement, the multi-mode zone is updated in step 1408.

A multi-mode zone is updated as follows. If the digit moved to a position in the multi-mode zone (e.g., 1506) between the STOP-point and the end of the scroll strip (outside the continuous region), the multi-mode zone is shifted to align the STOP-point with the current digit position). If the digit is still in the multi-mode zone as determined in step 1410, and it is within the existing continuous rate scrolling region, the continuous scrolling is executed in step 1412. In continuous scrolling, scrolling occurs automatically at a rate determined by where the digit is located in the continuous scrolling region. The user can vary the rate by moving their digit towards the transition point, to reduce the scrolling rate, or towards the STOP-point, to increase the rate. The maximum scrolling rate is the last proportional scrolling rate (the rate that the digit was moving across the scroll strip when it entered the multi-mode zone from the proportional zone). If it was determined in step 1410 that a digit is no longer in the multi-mode region (e.g., it is to the right of the transition point), in step 1414 the controller resets the last scroll rate to zero, the scroll distance and direction to "none", and stores the current time. The controller then returns to the logic switching manager in step 1406.

Alternatively to the variable rate continuous scrolling, it is envisioned that the multi-mode zone could produce continuous scrolling which is not variable. For example, the rate of continuous scrolling may be the maximum rate no matter where the digit is positioned in the multi-mode zone, so long as the digit remains in the multi-mode zone. This would provide non-variable continuous scrolling based on a digit speed measurement. The digit speed measurement associated with the continuous rate can be that rate associated with the last digit speed sampling prior to stopping, or it can be the speed that the digit crosses the boundary between the proportional zone.

Figure 18:
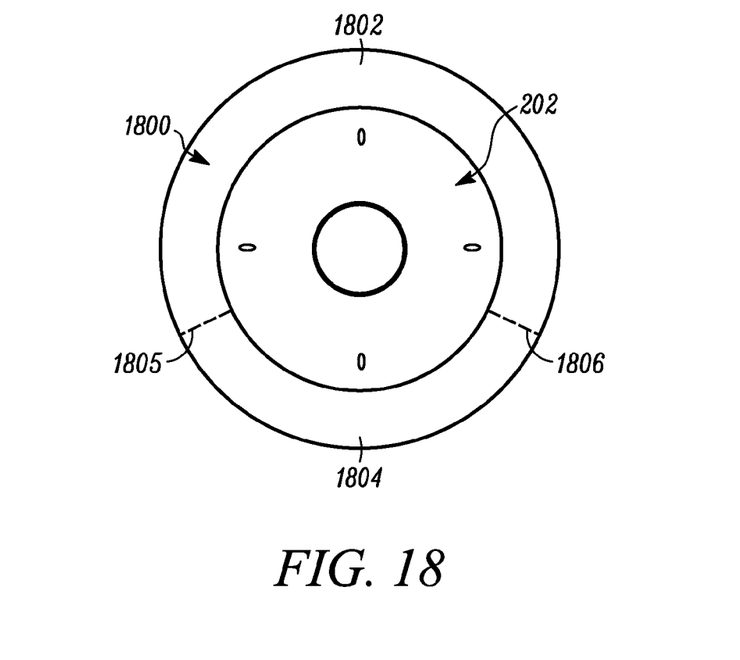
FIG. 18 illustrates an alternate scrolling strip of the communication device of FIG. 6A.

With reference to FIG. 18, the scroll strip 1800 is illustrated to be a full circle around the navigation interface 202. The scroll strip includes a proportional zone 1802 and a multi-mode zone 1804. The boundaries 1805, 1806 separate the proportional zone 1802 from the multi-mode zone 1804. The proportional zone 1802 and multi-mode zone 1804 operate mostly the same as the other proportional zones and multi-mode zones described above. However, the conditions for continuous scrolling are slightly different. In the embodiment of FIG. 18, the direction of continuous scrolling will be determined from the direction of travel in the multi-mode zone prior to the digit speed dropping below the speed threshold. Thus, a digit that comes to rest after moving clockwise in multi-mode zone 1804 will result in downward continuous scrolling at a rate determined from the previous speed measurement (the previous speed measurement being the last measurement prior to the digit speed dropping below the threshold). A digit that comes to rest after moving counter-clockwise in multi-mode zone 1804 will result in upward continuous scrolling at a rate determined from the previous speed measurement. It is thus the speed that the digit is traveling away from the proportional zone that rate of continuous scrolling.

Figure 19:
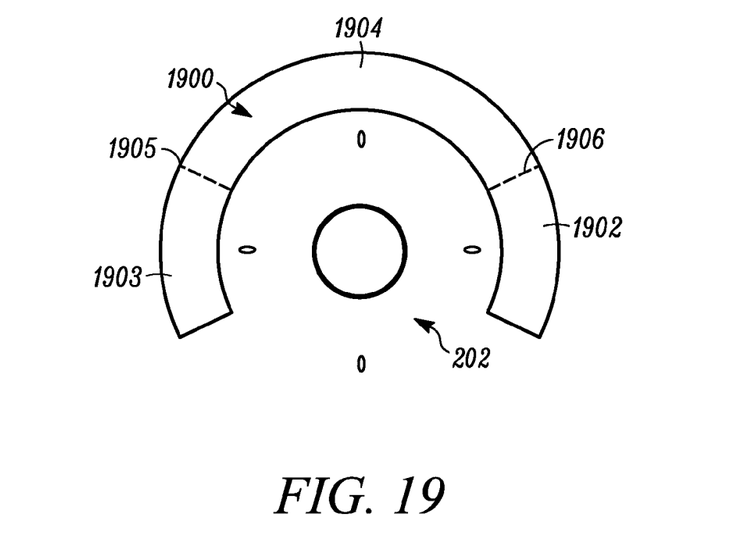
FIG. 19 illustrates another alternate scrolling strip of the communication device of FIG. 6A.

With reference to FIG. 19, the scroll strip 1900 extends part of the way around the navigation interface 202. The scroll strip includes proportional zones 1902 and 1903, a multi-mode zone 1904. The boundaries 1905, 1906 separate the proportional zones 1902, 1903 from the multi-mode zone 1904. The operation of the multi-mode zone 1904 is the same as multi-mode zone 1804. In the embodiment of FIG. 19, the direction of continuous scrolling will be determined from the direction of travel in multi-mode zone prior to the digit speed dropping below the speed threshold. Thus, a digit that comes to rest after moving clockwise in multi-mode zone 1904 will result in downward continuous scrolling at a rate determined from the previous speed measurement (the previous speed measurement being the last measurement prior to the digit speed dropping below the threshold). A digit that comes to rest after moving counter-clockwise in multi-mode zone 1904 will result in upward continuous scrolling at a rate determined from the previous speed measurement. It is thus the speed that the digit is traveling away from the proportional zone that rate of continuous scrolling. It is envisioned that the proportional zones 1902 and 1903 can support proportional scrolling in either direction of travel, such that clock-wise movement will produce downward scrolling and counter-clockwise movement will produce upward scrolling. The embodiment of FIG. 19 may be found to be advantageous for right handed operation of zones 1903 and 1904 using the right thumb when holding the device in the right hand, whereas zones 1902 and 1904 may be found advantageous for left handed control using the left them while holding the device in the left hand.

Scrolling speeds are exemplary. It is envisioned that they will vary depending upon user preferences, and may vary from 0-100 lines per second for a typical small display, such as that found on a mobile phone. The surface area of the user interface will vary depending upon the size of the device. For example, the size of navigation and scrolling interface 122 may be less than 25 millimeters in diameter, and the area of the navigation interface 202 may be less than 20 millimeters.

It can thus be seen that a new and improved user interface for a communication device is disclosed.

It is expected that one of ordinary skill, notwithstanding possibly significant effort and many design choices motivated by, for example, available time, current technology, and economic considerations, when guided by the concepts and principles disclosed herein will be readily capable of generating software instructions and programs and ICs with minimal experimentation.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A scrolling user interface, comprising:
  proportional scrolling responsive to contact in a proportional zone of a scrolling strip;
  multi-mode scrolling in response to contact in a multi-mode zone of the scrolling strip, said multi-mode zone includes proportional scrolling and continuous scrolling, continuous scrolling is associated with a speed measurement taken prior to a contacting digit movement speed dropping below a threshold speed, wherein the size of a variable rate continuous scrolling region is a function of the maximum speed of digit movement prior to the speed of a contacting digit dropping below the threshold speed.

2. The interface as defined in claim 1, wherein the rate of continuous scrolling is derived from the speed of digit movement prior to the speed of a contacting digit dropping below a threshold speed.

3. A scrolling user interface, comprising:
   proportional scrolling responsive to contact in a proportional zone of a scrolling strip;
   multi-mode scrolling in response to contact in a multi-mode zone of the scrolling strip, said multi-mode zone includes proportional scrolling and continuous scrolling, continuous scrolling being variable rate continuous scrolling, and wherein the maximum rate of continuous scrolling is associated with a speed measurement taken prior to a contacting digit movement speed dropping below a threshold speed, wherein the minimum speed of the variable rate continuous scrolling region is a transition point for proportional scrolling, and wherein the transition point can be positioned in the proportional zone or the multi-mode zone, and the transition point will be a function of the maximum rate of continuous scrolling and a location on the scrolling strip associated with the maximum rate of continuous scrolling.

4. The interface as defined in claim 3, wherein the region of the scrolling strip associated with continuous scrolling is dynamic.

5. The interface as defined in claim 3, further including multi-mode scrolling in a second multi-mode zone of the scrolling input.

6. The interface as defined in claim 3, further including stepped scrolling responsive to a digit tapping the scrolling strip.

7. The interface as defined in claim 3, further including stepped scrolling responsive to a digit tapping the multi-mode zone of the scrolling strip.

8. A method of scrolling for a user interface having a scrolling strip, comprising:
   scrolling in a proportional mode responsive to movement on a proportional zone of the scrolling strip;
   scrolling in a continuous mode responsive to contact in a multi-mode zone of the scrolling strip;
   detecting the speed of digit movement on the scrolling strip;
   setting a rate of continuous scrolling as a function of a speed measurement taken prior to detecting digit movement speed dropping below a threshold speed; and
   setting a maximum rate of variable continuous scrolling as a function of a speed measurement taken prior to detecting the digit movement speed dropping below a threshold speed.

9. The method as defined in claim 8, further including the step of detecting when the speed of digit movement drops below a threshold speed in the multi-mode zone.

10. The method as defined in claim 8, further including the step of detecting the direction of digit movement on the scrolling strip.

11. A method of scrolling for a user interface having a scrolling strip, comprising:
    scrolling in a proportional mode responsive to movement in a proportional zone of the scrolling strip;
    scrolling in a continuous mode responsive to contact in a multi-mode zone of the scrolling strip;
    detecting the speed of digit movement on the scrolling strip;
    setting a rate of continuous scrolling as a function of a speed measurement taken prior to detecting digit movement speed dropping below a threshold speed; and
    setting the size of the variable rate continuous scrolling region dependent upon the maximum speed of digit movement prior to the digit movement speed dropping below the threshold speed.

12. The method as defined in claim 11, further including the step of setting a transition point for proportional scrolling at an opposite end of the variable rate continuous scrolling region from the maximum scrolling rate, the transition point dependent upon the maximum rate of continuous scrolling.

13. The method as defined in claim 11, further including the step of detecting digit tapping of the scrolling strip, and activating stepped scrolling in response to detecting tapping.

14. A method of scrolling for a user interface having a scrolling strip, comprising:
    scrolling in a proportional mode responsive to movement in a proportional zone of the scrolling strip;
    scrolling in a continuous mode responsive to contact in a multi-mode zone of the scrolling strip;
    detecting when the speed of digit movement drops below a threshold speed in the multi-mode zone; and
    detecting if the digit movement direction in the multi-mode zone is away from the proportional zone, and detecting when the speed of digit movement drops below a threshold speed in the multi-mode zone results in continuous scrolling if the digit is in the rate zone traveling in a direction away from the proportional zone.

15. The interface as defined in claim 14, further including the step of detecting digit tapping in the multi-mode zone of the scrolling strip, and providing stepped scrolling in response to detecting tapping.

\* \* \* \* \*